United States Patent [19]

Haubner et al.

[11] 4,301,504

[45] Nov. 17, 1981

[54] INPUT-OUTPUT APPARATUS FOR A MICROPROCESSOR

[75] Inventors: Georg Haubner, Berg; Jürgen Wesemeyer, Nuremberg, both of Fed. Rep. of Germany

[73] Assignee: Robert Bosch GmbH, Stuttgart, Fed. Rep. of Germany

[21] Appl. No.: 22,103

[22] Filed: Mar. 20, 1979

[30] Foreign Application Priority Data

Mar. 21, 1978 [DE] Fed. Rep. of Germany ....... 2812241

[51] Int. Cl.³ .............................................. G06F 9/22
[52] U.S. Cl. .................................................. 364/200
[58] Field of Search ............... 365/105, 175, 189, 220, 365/221, 222, 180; 364/716, 200 MS File, 900 MS File; 340/166 R

[56] References Cited

U.S. PATENT DOCUMENTS

| | | | |
|---|---|---|---|
| 3,245,051 | 4/1966 | Robb | 365/105 |
| 3,671,948 | 6/1972 | Cassen et al. | 365/105 |
| 4,032,894 | 6/1977 | Williams | 340/166 R |
| 4,149,096 | 4/1979 | Holzner et al. | 340/166 R |

OTHER PUBLICATIONS

*Array Logic Processing*–Elliott et al.–IBM TDB, vol. 16, No. 2, 7/73, pp. 586–587.

*Primary Examiner*—Harvey E. Springborn
*Attorney, Agent, or Firm*—Frishauf, Holtz, Goodman & Woodward

[57] ABSTRACT

A microprocessor has a first and second set of output terminals, the second set also being utilized as input terminals. A matrix is provided which has a first set of lines connected to the first set of output terminals and a second set of lines connected to the second set of output terminals. A switch-diode combination is connected at selected points of intersection of the two sets of lines. For data input, each input signal to be entered into the microprocessor is applied to close a respective one of the switches. Lines connected to the first set of terminals are then interrogated individually, by application of an "O" signal on the line. This is transferred to the corresponding one of the second set of lines only when the associated switch is closed. The so-transferred "O" signals are stored in a register in the microprocessor which is assigned to the interrogated line. For data output, all lines connected to the first set of outputs carry a "1" signal. The diodes block the "1" signals from the second set of lines and signals are transmitted from the second set of outputs to indicating instruments.

2 Claims, 1 Drawing Figure

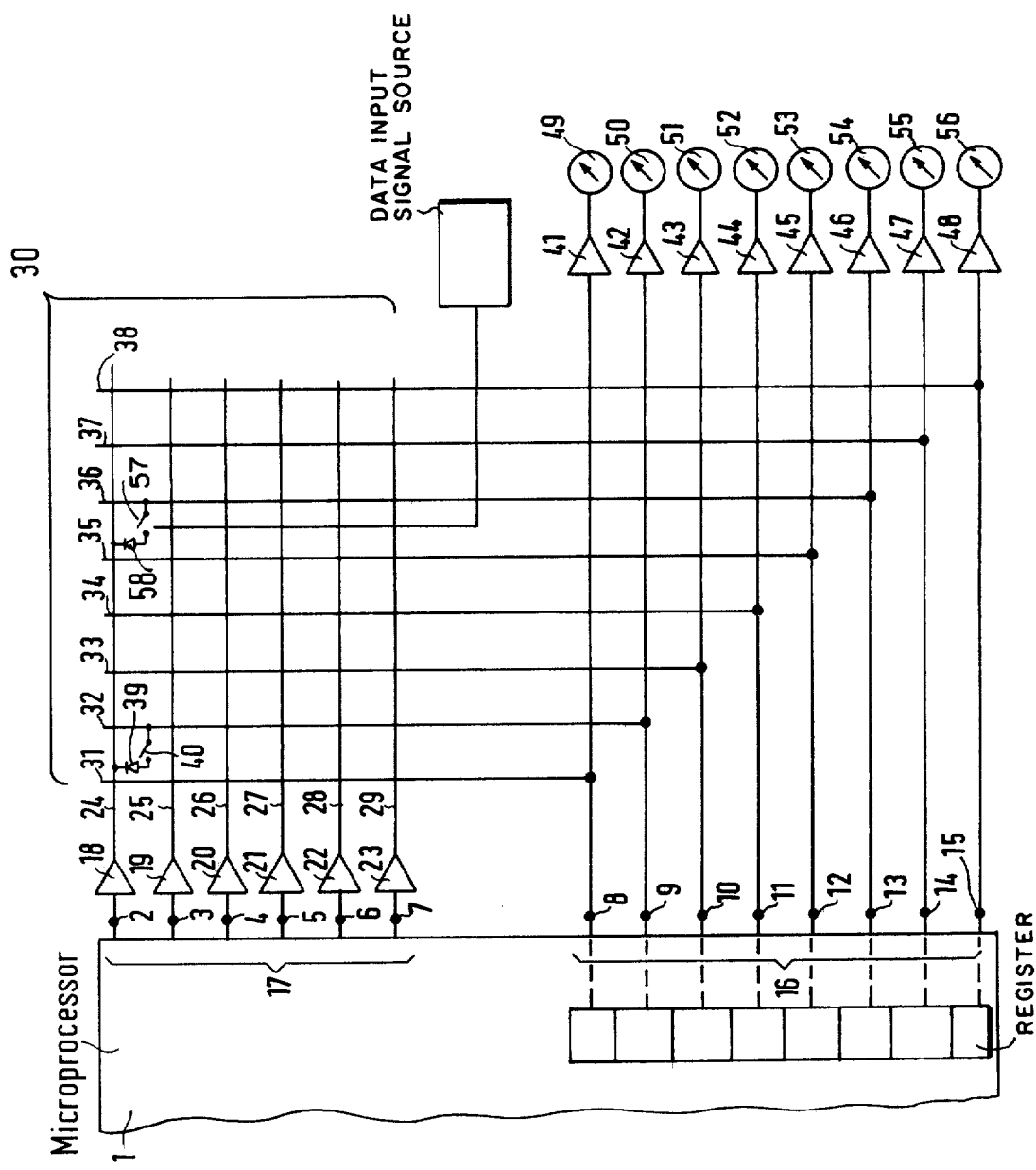

INPUT-OUTPUT APPARATUS FOR A MICROPROCESSOR

CROSS-REFERENCE TO RELATED APPLICATIONS AND PUBLICATIONS

U.S. application Ser. No. 916,827 filed June 19, 1978, now U.S. Pat. No. 4,204,256.

The present invention relates to input and output apparatus from microprocessors and, more particularly, for microprocessors furnishing static output signals.

Background and Prior Art

Apparatus is known, in which, for microprocessors with dynamic output signals, storages are provided which convert the dynamic output signals to static output signals. Such apparatus is relatively expensive.

Data input and output apparatus for microprocessors with static output signals are known which utilize so-called expanding units. Such expanding units are also relatively expensive and, further, they allow only a very limited amount of data input.

The Invention

It is an object of the present invention to furnish an input-output apparatus for a microprocessor which is extremely inexpensive, which allows a relatively large amount of binary input data to be received and which further allows such received input data to condition circuits within the microprocessor to output data over another set of output terminals.

The present invention is an input-output system for a microprocessor. The microprocessor has a first set of output terminals and a second set of output terminals.

The input-output system comprises a plurality of first lines and circuits, for example inverter circuits, for connecting each of said plurality of first lines to a respective output terminal of said first set of output terminals. The system further comprises a plurality of second lines each connected to a respective output terminal of said second set of output terminals. A plurality of indicators, such as measuring instruments responsive to the average value of signals applied thereto, is provided. Each of the indicators is connected to a respective output terminal of the second set of output terminals and, thereby, to a respective one of the plurality of second lines by second connecting circuits, as for example, further inverter circuits. The operation of the microprocessor is divided into data input time intervals and data output time intervals, the data output time intervals being substantially longer than the data input time intervals. The microprocessor creates a binary signal having a first level on each of the plurality of first lines in turn during each data input time interval, and binary signals having a second level on all of the plurality of first lines during each data output time interval. Additionally, the microprocessor is programmed to furnish an output signal for application to the respective one of the indicators at each output terminal of the second set of output terminals during each data output time interval.

Finally, a plurality of logic circuits is provided. Each of the logic circuit comprises switch elements such as a transistor or a thyristor, which is open and closed in respective absence and presence of a data input signal. Each logic circuit further comprises unidirectional conducting elements, such as a diode, series-connected to the switch elements for blocking transmission of binary signals of the second level and permitting transmission of binary signals of the first level from the first to the second line. Thus, during each data input time interval, a first level binary signal is transmitted from each of the first lines in turn to output terminals of the second set selected by the data input signals. During the substantially longer data output time interval, signal transmission from the first to the second set of lines is blocked by the diodes and output signals from the microprocessor available at the second set of output terminals are applied to the measuring instruments. The second set of output terminals thus operates alternately as input terminals and as output terminals.

DRAWING ILLUSTRATING A PREFERRED EMBODIMENT

The single FIGURE is a schematic diagram of input-output apparatus for a microprocessor.

In the FIGURE, a microprocessor 1 has a plurality of terminals 2-15. The output terminals 2-7 together are referred to herein as a first set of output terminals and are denoted by reference numeral 17, while terminals 8-15 are referred to as a second set of output terminal and are denoted by reference numerals 16. As will become obvious from the discussion below, terminals 8-15, in accordance with the present invention, operate as input-output terminals while terminals 17 operate as output terminals only.

The respective inputs of inverters 18, 19, 20, 21, 22 and 23 are connected to terminals 2, 3, 4, 5, 6 and 7. The outputs of inverters 18-23 are connected to lines 24, 25, 26, 27, 28 and 29 respectively. The latter form part of a diode switching matrix 30. Matrix 30 further has a second set of lines (column lines) 31-38, each of which is connected to a respective one of terminals 8-15.

The construction of a diode matrix as such is well known in the data processing field. Therefore the description of diode matrix 30 will be brief. Lines 24-29 intersect lines 31-38 at intersection points. At each of the intersection points an electrical connection by means of a series circuit (logic circuit) including a diode and a switch is provided between the so-intersecting lines. Switch 40, which, in a preferred embodiment, is a semiconductor switch such as a transistor or thyristor, switches to a closed (conductive) state in response to a data input signal applied from an external source. These data input signals constitute inputs to the microprocessor. Only when such a data input signal is applied to switch 40 is an electrical connection between the two intersecting lines established.

Each of a plurality of inverters 41-48 has an inverting input connected to a respective one of outputs 8-15 and an output connected to an indicator instrument. The indicator instruments are denoted by reference numerals 49-56. The signals furnished at terminals 8-15 and displayed on indicator units 49-56 may for example be digital signals indicating limiting values or may be analog signals represented by digital pulse sequences whose average value is formed by and displayed on a measuring instrument 49-56. The signals at the outputs of inverters 41-48 may of course be binary coded signals. The type of data at the output of microprocessor 1 depends on its programming and its construction. As an example let it be assumed that each of the indicator instruments 49-56 is a measuring instrument which forms an average value and displays same. For this application, each of terminals 8-15 furnishes a pulse sequence having a varying on/off ratio. Measuring instruments 49-56 then indicate the average value of this pulse sequence.

Data input takes place as follows. First let it be assumed that a data input signal from the external source is applied to switch 40 at the intersection of line 24 and line 32 as well as to a switch 57 at the intersection of line 24 and line 36. The programming of microprocessor 1 causes line 24 to be interrogated first. For this purpose a "1" signal appears at terminal 2 which is converted to a "0" signal by inverter 18. A "0" signal thus appears on line 24. This "0" signal is applied to line 32 through diode 39 and switch 40 and to line 36 through diode 58 and switch 57. A "0" signal is therefore applied to terminals 9 and 13, both now acting as input terminals. These inputs are, at this point, high resistance inputs. The "0" signal applied at terminals 9 and 13 is transferred to a register for line 24 within microprocessor 1. While the output of inverter 18 is "0" signal, the signal at the outputs of inverters 19–23 are "1" signals as controlled by the program in microprocessor 1. The diodes connecting lines 25–29 to lines 31–38 block the transmission of the "1" signals, so that only data input signals applied to switches associated with line 24 are effective.

The next programming step of microprocessor 1 causes a "0" signal to appear at the output of inverter 19 and "1" signals to appear at inverters 18, 20, 21, 22 and 23. Any "0" signals now appearing at terminals 8–15 are transferred to a register for line 25. The remaining lines are then interrogated in order, the "0" signals resulting from the interrogation of each line being transferred to corresponding registers in microprocessor 1.

After data input via terminals 8–15, data output takes place over the same terminals and through inverters 41–48. It should be noted that the time during which data input takes place should be relatively short compared to the time during which data output takes place, since the latter is interrupted during data input and therefore the magnitude of the errors in the displayed outputs increases with increasing data input times. Data output of course occurs only when all of lines 24–29 carry a "1" signal since, as stated above, signal transmission from lines 24–29 to lines 31–38 is then interrupted by the diodes of the switch-diode combinations.

In summary it should be noted that the very simple apparatus of the present invention is suitable for data inputs and data outputs even of measuring values of relatively long duration. The error of the value indicated by measurement instruments 49–56 which respond to an average value will be a function of the ratio of data output time to data input time. If this ratio is large, then the error of the indicated values is relatively small. The ratio of the data output time to data input time is therefore determined by the required accuracy with which the measured values are to be furnished. A microprocessor suitable for use with the apparatus described above is, for example, a microprocessor denoted by number.

These microprocessors must then be equipped with inverters 18 to 23 and 41 to 48. Other microprocessors may furnish signals at terminals 2–7 which do not require further inversion. The amount of equipment need for the apparatus of the present invention is therefore further decreased when such microprocessors are used.

Various changes and modifications may be made within the scope of the inventive concepts.

We claim:

1. Input-output system for a microprocessor, said microprocessor having a first (17) set of output terminals and a second (16) set of output terminals, said system comprising a plurality of first lines (24–29);

first connecting means (18–23) for connecting each of said plurality of first lines to a respective output terminal of said first set of output terminals;

a plurality of second lines (31–38) each connected to a respective output terminal of said second set of output terminals;

a plurality of indicator means (49–56);

second connecting means (41–48) for connecting each of said indicator means to a respective output terminal of said second set of output terminals and, thereby, to a respective one of said plurality of second lines;

wherein said microprocessor (1) includes means for imposing a binary signal having a first level on each of said plurality of first lines in turn during a data input time interval and binary signals having a second level on all of said plurality of first lines during a data output time interval substantially exceeding said data input time interval;

wherein said microprocessor further includes means for imposing an output signal at each output terminal of said second set of output terminals only during said data output time interval;

and further comprising a plurality of logic circuits each comprising switch means (40,57) open and closed in the respective absence and presence of a data input signal, and unidirectional conducting means for blocking transmission of binary signals of said second level and permitting transmission of binary signals of said first level from a said first to a said second line, whereby a first level binary signal is transmitted from each of said first lines in turn to output terminals of said second set selected by said data input signals during said data input time interval.

2. Input-output system as set forth in claim 1, wherein a binary signal having a first level is an "0" signal, and a binary signal having a second level is a "1" signal; and wherein said first connecting means comprises a plurality of inverters, each connected to a respective one of said first set of output terminals.

* * * * *